US010678238B2

(12) United States Patent
Moeller et al.

(10) Patent No.: US 10,678,238 B2
(45) Date of Patent: Jun. 9, 2020

(54) MODIFIED-REALITY DEVICE AND METHOD FOR OPERATING A MODIFIED-REALITY DEVICE

(71) Applicant: Intel IP Corporation, Santa Clara, CA (US)

(72) Inventors: Marco Moeller, St. Leon-Rot (DE); Cornelius Claussen, Bad Schoenborn (DE); Daniel Pohl, Puchheim (DE)

(73) Assignee: Intel IP Corporation, Santa Clara, CA (US)

( * ) Notice: Subject to any disclaimer, the term of this patent is extended or adjusted under 35 U.S.C. 154(b) by 211 days.

(21) Appl. No.: 15/847,955

(22) Filed: Dec. 20, 2017

(65) Prior Publication Data

US 2019/0049949 A1 Feb. 14, 2019

(51) Int. Cl.
*G05D 1/00* (2006.01)
*B64C 39/02* (2006.01)
*G06T 19/00* (2011.01)
*G06F 3/01* (2006.01)
*G02B 27/01* (2006.01)

(52) U.S. Cl.
CPC ......... *G05D 1/0044* (2013.01); *B64C 39/024* (2013.01); *G02B 27/017* (2013.01); *G05D 1/0038* (2013.01); *G06F 3/012* (2013.01); *G06T 19/006* (2013.01)

(58) Field of Classification Search
CPC .. G05D 1/0044; B64C 39/024; G02B 27/017; G06F 3/012; G06T 19/006
USPC ............................................................. 701/2
See application file for complete search history.

(56) References Cited

U.S. PATENT DOCUMENTS

| | | | | |
|---|---|---|---|---|
| 9,324,229 | B2* | 4/2016 | Baillot | G08B 25/016 |
| 10,043,316 | B2* | 8/2018 | Donnelly | G05D 1/0278 |
| 10,114,127 | B2* | 10/2018 | Brown | G06F 3/04842 |
| 2012/0007852 | A1* | 1/2012 | Morate | G06T 19/006 |
| | | | | 345/419 |
| 2018/0249086 | A1* | 8/2018 | Ozawa | G06F 3/147 |
| 2018/0249343 | A1* | 8/2018 | Priest | G06Q 10/0875 |
| 2018/0254022 | A1* | 9/2018 | Shahal | G01C 23/005 |
| 2018/0352144 | A1* | 12/2018 | Miao | G06K 9/6268 |

(Continued)

OTHER PUBLICATIONS

Wikipedia "Head-up display", https://en.wikipedia.org/wiki/Head-up_display, last edited on Jan. 5, 2018.

*Primary Examiner* — Thomas G Black
*Assistant Examiner* — Wae L Louie
(74) *Attorney, Agent, or Firm* — Viering, Jentschura & Partner mbB

(57) ABSTRACT

According to various aspects, a modified-reality device may be described, the modified-reality device including: a head-mounted device including one or more displays, wherein the one or more displays are configured to receive image data representing at least an image element and to display a modified-reality image including at least the image element; one or more sensors configured to provide head tracking data associated with a location and an orientation of the head-mounted device; and a processing arrangement configured to receive flight data associated with a flight of an unmanned aerial vehicle, generate the image data representing at least the image element based on the head tracking data and the flight data, and provide the image data to the one or more displays.

20 Claims, 7 Drawing Sheets

(56) References Cited

U.S. PATENT DOCUMENTS

2019/0002103 A1\* 1/2019 Gomez Gutierrez ........................ H04W 4/023
2019/0042003 A1\* 2/2019 Parazynski .............. G08B 5/36
2019/0049949 A1\* 2/2019 Moeller ................ B64C 39/024
2019/0066379 A1\* 2/2019 Dickenson .............. H04L 67/22

\* cited by examiner

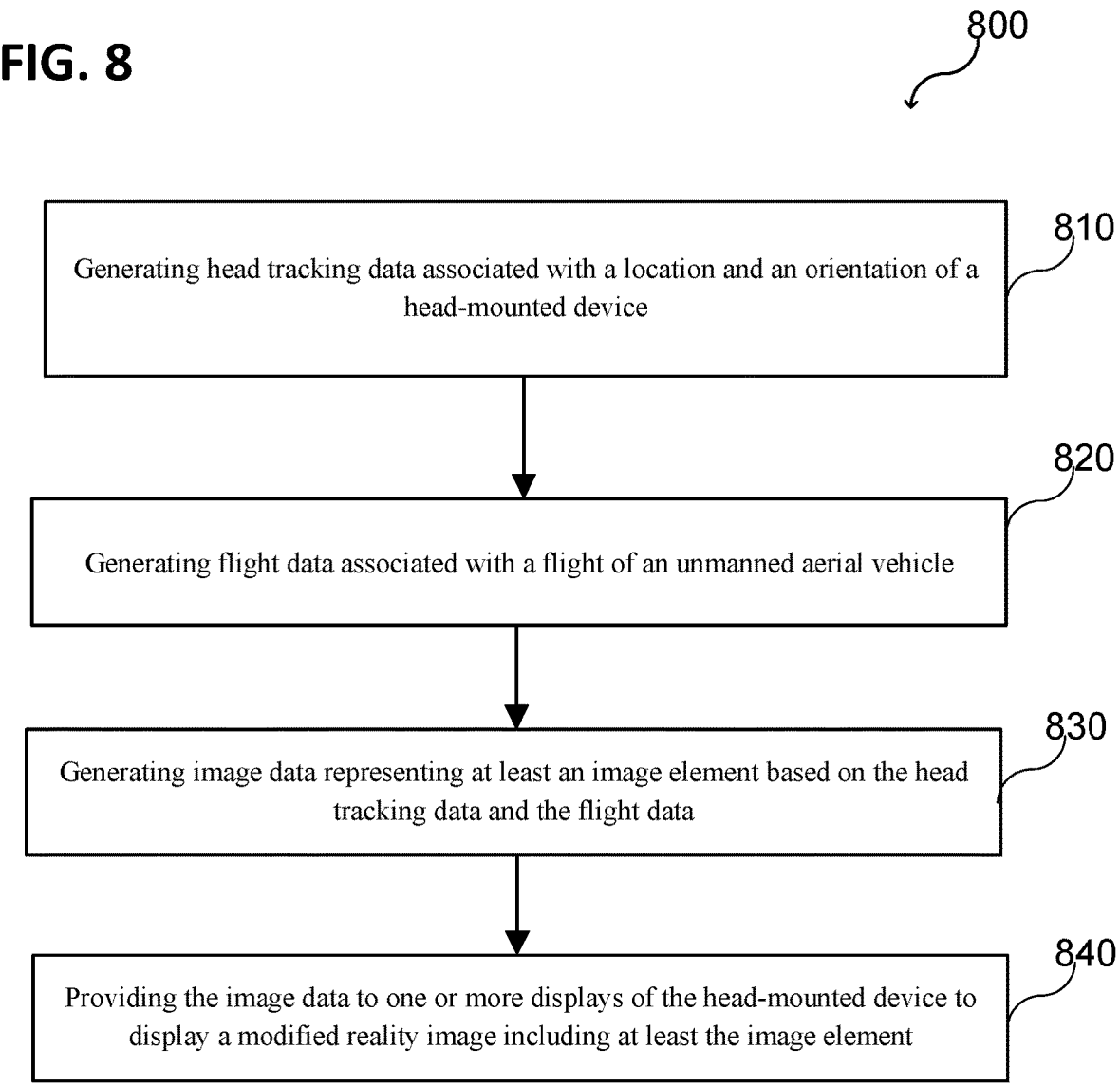

MODIFIED-REALITY DEVICE AND METHOD FOR OPERATING A MODIFIED-REALITY DEVICE

Various aspects relate generally to a modified-reality device and a method for operating a modified-reality device.

BACKGROUND

An unmanned aerial vehicle may have one or more processors to control flight of the unmanned aerial vehicle along a predefined flight path. The one or more processors to control flight of the unmanned aerial vehicle may be or may include a flight controller. The predefined flight path may be provided and/or modified, for example, by manual remote control, waypoint control, target tracking, etc. Further, an obstacle detection and avoidance system may be implemented to avoid collision of the unmanned aerial vehicle with an obstacle located in the predefined flight path of the unmanned aerial vehicle. In one or more applications, an unmanned aerial vehicle may be remotely controlled by a user. The user controlling the unmanned aerial vehicle may be also referred to as pilot. The pilot may control flight of the unmanned aerial vehicle so that the unmanned aerial vehicle may remain visible for the user, in other words, the unmanned aerial vehicle may remain within the pilot's line of sight. Further, a pilot may control flight of the unmanned aerial vehicle while using first person view glasses, wherein a video signal is transmitted from the unmanned aerial vehicle to the first person view glasses. The video signal may be provided by a camera mounted at the unmanned aerial vehicle so that the pilot may see the vicinity of the unmanned aerial vehicle from the perspective of the unmanned aerial vehicle and not from his own perspective, e.g., from the ground.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 8 shows an exemplary method for operating a modified-reality device, according to various aspects.

DESCRIPTION

Figure 1:
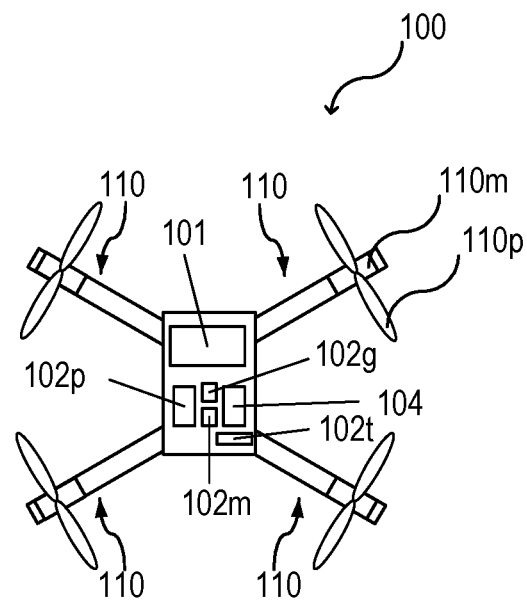
FIG. 1 shows an unmanned aerial vehicle in a schematic illustration, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure.

The various aspects of the disclosure are not necessarily mutually exclusive, as some aspects can be combined with one or more other aspects to form new aspects.

Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a display system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regard to a "position of an unmanned aerial vehicle", "position of a user", "position of an obstacle", and the like, may be used herein to mean a point or region in a two- or three-dimensional space (also referred to as location). It is understood that suitable coordinate systems with respective reference points are used to describe positions, vectors, movements, and the like. The term "flight path" used with regard to a "predefined flight path", a "traveled flight path", a "remaining flight path", and the like, may be understood a trajectory in a two- or three-dimensional space. The flight path may include a series (e.g., a time-resolved series) of positions along which the unmanned aerial vehicle has traveled, a respective current position, and/or at least one target position toward which the unmanned aerial vehicle is traveling. The series of positions along which the unmanned aerial vehicle has traveled may define a traveled flight path. The current position and the at least one target position may define a remaining flight path.

The term "map" used with regard to a two- or three-dimensional map may include any suitable way of describing positions of objects in the two- or three-dimensional space. According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

The unmanned aerial vehicle, according to various aspects, may include a camera gimbal having an independent two- or three-axes degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the unmanned aerial vehicle, etc. A depth camera may allow associating depth information with an image, e.g., to provide a depth image. This allows, for example, providing an image of the vicinity of the unmanned aerial vehicle including depth information about one or more objects depicted in the image.

As an example, a depth image may include information to indicate a relative distance of objects displayed in the image. This distance information may be, but is not limited to, colors and/or shading to depict a relative distance from a sensor. Positions of the objects may be determined from the depth information. Based on depth images, a three dimensional map may be constructed from the depth information. Said map construction may be achieved using a depth map engine, which may include one or more processors or a non-transitory computer readable medium configured to create a voxel map (or any other suitable map) from the depth information provided by the depth images. According to various aspects, a depth image may be obtained by a stereo camera, e.g., calculated from two or more images having a different perspective.

The unmanned aerial vehicle, according to various aspects, includes at least one sensor for obstacle detection, e.g. only one sensor, two sensors, or more than two sensors. The at least one sensor can be fixedly mounted on the support frame of the unmanned aerial vehicle. Alternatively, the at least one sensor may be fixed to a movable mounting structure so that the at least one sensor may be aligned into a desired direction. The number of sensors for obstacle detection may be reduced to only one sensor that is directed into a heading direction of the unmanned aerial vehicle.

According to various aspects, an unmanned aerial vehicle may have a heading direction. The heading direction may be understood as a reference direction assigned with a straight-forward flight direction. The orientation of an unmanned aerial vehicle during flight may be described by attitude information, including angles of rotation (e.g., referred to as roll, pitch, and yaw) in three orthogonal rotational directions with reference to the center of mass of the unmanned aerial vehicle; the rotational directions may be referred to as roll-axis, pitch-axis, and yaw-axis.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propeller has one or more propeller blades. The propellers may be fixed pitch propellers.

The unmanned aerial vehicle may be configured to operate with various degrees of autonomy: under remote control by a human operator, or fully or intermittently autonomously, by onboard computers. The unmanned aerial vehicle may be configured to take-off and land autonomously in a take-off and/or a landing mode. Alternatively, the unmanned aerial vehicle may be controlled manually by a remote control (e.g. a radio control, RC) at take-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or save distance. The unmanned aerial vehicle may have one or more fails safe operations modes, e.g., returning to the starting point, landing immediately, etc. In some aspects, the unmanned aerial vehicle may be controlled manually, e.g., by a remote control during flight, e.g. temporarily.

In general, in the case that an unmanned aerial vehicle is steered via a remote control from the ground, the pilot may stand rather still on the ground and may follow the flying unmanned aerial vehicle with the pilot's head and eyes. However, as the unmanned aerial vehicle increases the distance from the pilot, it may become less visible, e.g., up to the point where the user cannot see the unmanned aerial vehicle anymore, or at least cannot see the orientation of the modified-reality device anymore.

In many countries, there may be laws that may require that the unmanned aerial vehicle (e.g. referred to as drone) should be flown only as long as it is still visible to the pilot.

In other situations, even when the drone might still be close, the pilot might have trouble following it because of being blinded by the sun or because of other conditions, e.g., because of weather conditions like rain, e.g., because of smoke or dust, etc.

In cases of distraction or disorientation, the pilot might lose an overview of where the unmanned aerial vehicle is flying and, in this case, the pilot may have no indication of which direction the pilot should look to resume visual contact with the flying unmanned aerial vehicle.

Furthermore, in the case that the unmanned aerial vehicle is flying close to the ground, it may be difficult to judge for the pilot if it is still safe or if there is a risk of a collision.

In some aspects, a setup may be provided including a modified-reality device. The modified-reality device may be configured to provide a modified-reality image to a user of the modified-reality device. The user of the modified-reality device may be the pilot of an unmanned aerial vehicle. According to various aspects, the modified-reality image may include at least one or more image elements associated with the unmanned aerial vehicle. As an example, the one or more image elements may represent the unmanned aerial vehicle at its current position with its current orientation relative to the modified-reality device (or in other words, relative to a user of the modified-reality device, e.g., relative to the pilot). According to various aspects, the one or more image elements that are associated with the unmanned aerial vehicle may represent a current position and/or a current orientation of the unmanned aerial vehicle relative to the pilot. These one or more image elements may be determined based on the current perspective (e.g., the current field of view) of the pilot.

The modified-reality device may be configured to allow the user to see the unmanned aerial vehicle directly or indirectly at the right position with the correct orientation of the drone in the case that the unmanned aerial vehicle is within the field of view of the user. In the case that the user has lost the view to the unmanned aerial vehicle, the user may be guided back to the unmanned aerial vehicle via one or more image elements displayed via the modified-reality device.

In general, there may be applications for devices that may display a flying object (e.g. drone) and its current position. However, these devices may need to be held by the user, which may be impractical, since the pilot may need to keep both hands on the remote control to control flight of the unmanned aerial vehicle. As another example, a head-up display (HUD) may be used in military jets and may be integrated into the pilot's helmet. However, the pilot's perspective in a jet may be different from the application as referred to herein, in which the pilot is in a position outside the unmanned aerial vehicle and pilots the unmanned aerial vehicle from his position (e.g., standing on the ground), wherein the unmanned aerial vehicle may be, for example, within line of sight of the pilot. However, some applications, as, for example, first person view (FPV) applications, may allow the pilot standing on the ground to see the flight of the unmanned aerial vehicle from the perspective of the unmanned aerial vehicle, e.g., simulating the view of a pilot who would sit within the unmanned aerial vehicle, similar to a pilot flying in a jet. In a similar way, synthetic vision systems (SVS) may be used that may render three-dimensional data like terrains to guide a pilot from the first person view. However, in such a fully artificial rendered image the perspective may be the perspective of the flying object.

According to various aspects, a modified-reality device is provided. The modified-reality device may be, or may include, a head-mounted device (also referred to as head-mounted display). The head-mounted device may include one or more displays. As an example, the head-mounted device may include a single display in front of one eye of the user (also referred to as monocular head-mounted device). Alternatively, the head-mounted device may include two displays in front of both eyes of a user (also referred to as binocular head-mounted device). A head-mounted device may be worn on the head of the user and may have a fixed orientation relative to the orientation of the user's head. The head-mounted device (e.g., the position of the one or more displays to the user's eyes) may define a field of view and/or a current viewing direction of the user. A modified-reality device (or the head-mounted device of a modified-reality device) may be, or may include, one of the following devices: virtual reality glasses, a virtual reality head-mounted display, augmented reality glasses, an augmented reality head-mounted display, a mixed reality device, a merged reality device, etc.

In some aspects, a head-mounted device may display only computer-generated images (also referred to as virtual reality). Alternatively, a combination of a computer-generated image and a live view of the real-world may be provided by the head-mounted device. The computer-generated image may be superimposed on the user's live view of the real-world by using a see-through configuration; alternatively, at least one camera may be used to obtain a live image of the real-world (also referred to as an illusory view). According to various aspects, a computer-generated image may be superimposed on a user's real-world view (also referred to as augmented reality). Combining a real-world view with one or more computer-generated images may be achieved by various techniques. As an example, the computer-generated image may be projected via a partially reflective mirror to the user's eyes, wherein the user still has a direct view of the real-world through the partially reflective mirror (also referred to as see-through). Alternatively, the computer-generated imagery may be combined electronically with camera images (e.g., a live video) from a camera (also referred to as video see-through or illusory view). However, other configurations using optics may be used to generate a modified-reality image for the user.

According to various aspects, an image showing rendered three-dimensional content may be combined with camera images of the real-world or see-through configuration images of the real-world from the perspective of a pilot of an unmanned aerial vehicle. To provide a see-through configuration, one or more optics (e.g., including one or more mirrors and/or one or more lenses, etc.) and one or more projectors may be used to reflect projected images such that users may see through the projected images.

A modified-reality device that may be used in combination with an unmanned aerial vehicle as described in more detail below, according to various aspects.

A user may wear a head-mounted device that may be at least part of a modified-reality device, e.g., of a virtual reality device or of an augmented reality device. The modified-reality device may include a head tracking function to track the current head orientation and position of the user. In other words, the modified-reality device may include a head tracking function to track the current orientation of a head-mounted device worn by the user and to determine the current position of the head-mounted device. Various sensor elements and control logic elements may be used to implement the head tracking function, e.g., to determine the orientation and/or movement of the user's head and/or of the head-mounted device. The user may be a pilot of an unmanned aerial vehicle that may be associated with the modified-reality device. The position of the user and/or head-mounted device may be determined, for example, via GPS. According to various aspects, the unmanned aerial vehicle may have a position detection system, e.g., GPS, to obtain position data representing the current position of the unmanned aerial vehicle during flight. The current orientation of the unmanned aerial vehicle during flight may be determined via one or more sensors, as, for example, one or more gyroscopic sensors, one or more accelerometer sensors, etc., disposed inside the unmanned aerial vehicle.

According to various embodiments, the user may control flight of the unmanned aerial vehicle via a remote control. The remote control, the unmanned aerial vehicle, and the modified-reality device may be linked with one another to allow a desired data exchange. The data exchange may be carried out via analogue signal transmission and/or digital signal transmissions, e.g., via 5G networks, WiFi, etc.

According to various aspects, a geographic information system (GIS) and/or a database including three-dimensional terrain information and no-fly zone information may be used to generate a modified-reality image for the user of the modified-reality device. Further, a database including, for example, obstacle data representing positions of buildings, trees, etc., may be used to generate a modified-reality image for the user of the modified-reality device. Further, the unmanned aerial vehicle may have the capability of a three-dimensional perception of its vicinity that may be used to generate a modified-reality image for the user of the modified-reality device.

According to various embodiments, the modified-reality device may include at least one camera that films in viewing direction of the user of the modified-reality device. Ideally, the camera's field of view may be close to the user's field of view. The camera may be a stereoscopic camera for a stereoscopic view.

According to various aspects, the modified-reality device may be configured to draw and highlight automatically where the unmanned aerial vehicle is located, e.g., based on the position of the user and orientation of the user's head and the position and orientation of the unmanned aerial vehicle, and to overlay this in the video captured from the camera. According to various aspects, the overlay could be done with a general drone icon. Alternatively, a three-dimensional model of the actual unmanned aerial vehicle may be stored and rendered accordingly, which allows a more realistic view. According to various aspects, the position of the user and orientation of the user or the user's head may be determined via the head-mounted device worn by the user.

It may be assumed that the position of the user and orientation of the user's head may be in a fixed relationship with the position and orientation of the head-mounted device worn by the user.

According to various aspects, an excessively bright video input provided by the camera, e.g. in the case that the user looks into the sun, may be corrected, e.g., the displayed brightness may be reduced to not blind the pilot and to show where the unmanned aerial vehicle is currently located.

As another example, in the case that the unmanned aerial vehicle becomes more distant and covers only a few pixels on the screen, an additional viewport may be added into the scene, showing, for example, a zoomed-in version of the drone. In this way, the user/pilot may see the orientation of the unmanned aerial vehicle in the zoomed-in version and, therefore, may be able to steer it accordingly. The additional viewport may be an image element of the modified-reality image provided to the user of the modified-reality device.

In the case that the user/pilot may have lost the view of the unmanned aerial vehicle, e.g., from distraction, disorientation, etc., an arrow (or any other suitable image element) may be added into the displayed modified-reality image. The arrow may be displayed in such a way that the arrow hints to the pilot where to look to result visual contact with the unmanned aerial vehicle. Additionally, another viewpoint may be provided showing a rendered (e.g., live) view of the unmanned aerial vehicle with its orientation to provide the pilot with more information.

According to various aspects, a connection from the pilot to a map system or to a GIS data system may additionally allow overlaying of further information, e.g., representing buildings or other obstacles that may be located in the vicinity of the unmanned aerial vehicle during flight. Further, in some areas like airports there are may be a no-fly zone for pilots of an unmanned aerial vehicle. According to some aspects, the modified-reality device may be configured to determine (e.g., to download) a position of a no-fly zone and with the knowledge of the position of the unmanned aerial vehicle, the modified-reality device may automatically warn the pilot visually where the no-fly zone is, e.g. by drawing a red transparent wall overlay in these areas, correctly displayed for the head orientation of the user.

According to various aspects, a three-dimensional perception of the unmanned aerial vehicle, as, for example, distances from one or more objects, etc., may be live-rendered into the display. This may be useful, since typical GIS databases of obstacles, terrain, airspaces, buildings, etc., may be of poor resolution, incomplete, and/or outdated. Especially in industrial inspection applications, the unmanned aerial vehicle may be operated in a very close distance from an object, but must maintain sufficient space to avoid colliding with the object.

According to various embodiments, the head-mounted device may be capable of tracking the head movement of the pilot, which may allow estimation of whether the pilot is currently able to visually track the unmanned aerial vehicle, as may be legally required in at least some countries. Theoretically, the pilot may have sustained an accident, e.g., a motor vehicle collision, loss of consciousness, myocardial infarction, etc. Once it is determined that the pilot has not followed the unmanned aerial vehicle for a predetermined period, it may be assumed that something has happened, and the unmanned aerial vehicle may be controlled to take safety actions accordingly. As an example, a safety action may include flying back to the starting point of the unmanned aerial vehicle's flight, causing the unmanned aerial vehicle to hover, performing an emergency landing of the unmanned aerial vehicle, etc. According to various aspects, one or more sound signals and/or one or more haptic signals may be generated by the unmanned aerial vehicle, by the remote control, and/or by the modified-reality device of the pilot to, for example, awaken the pilot or to get the pilot's attention.

As an example, after landing the unmanned aerial vehicle, it may be detected whether there has been a reaction from the pilot and/or a movement of the unmanned aerial vehicle (e.g., measured through the internal sensors, e.g., via a gyroscope) within a pre-defined period, and, if no reaction has been detected, an automated help call may be issued via the modified-reality device to an emergency phone line or another preset phone number. As an example, a message may be sent reporting the current position of the unmanned aerial vehicle and/or a potential impairment of the pilot. Further, the location of the pilot may be reported, if desired.

According to various aspects, through the head-mounted device view, a training simulator may be used to teach amateurs how to fly an unmanned aerial vehicle. The training simulator may include one or more tutorials (also referred to as training task or training flight task) where the pilot should perform pre-defined actions as indicated, for example, by a "ghost" unmanned aerial vehicle (e.g., a computer generated virtual unmanned aerial vehicle) in the modified-reality image provided by the modified-reality device. As an example, a tutorial could show the ghost unmanned aerial vehicle, for example, flying in a rectangular formation, and the pilot should repeat this action. This may be executed, for example, in safe areas, where the danger of hurting other people or destroying inventory may be minimized. As an example, the modified-reality device may be configured to determine whether the pilot is located in such a safe area so that a training flight task can be generated. Further, this may offer training situations, even for experts, which would be hard to recreate artificially otherwise. It could be simulated, for example, that a certain component of the unmanned aerial vehicle is failing or that the battery would be empty (e.g., even though it is not). The pilot may train how to react in this situation and may receive one or more advices in the display of the modified-reality device to help him to react accordingly.

In the following, various configurations and/or functionalities of an unmanned aerial vehicle are described, according to various aspects. In one or more aspects, the unmanned aerial vehicle may be linked to a modified-reality device and/or may be part of a modified-reality device system, as described in more detail below. The modified-reality device may be configured to maintain the perspective of the pilot (e.g., standing on the ground) while adding one or more additional image elements representing detailed information that may be useful for the pilot, e.g., the position of the unmanned aerial vehicle, the orientation of the unmanned aerial vehicle, etc.

FIG. 1 illustrates an unmanned aerial vehicle 100 in a schematic illustration, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. According to various aspects, the one or more drive motors 110$m$ of the unmanned aerial vehicle 100 may be electric drive motors. Therefore, each of the vehicle drive arrangements 110 may be also referred to as electric drive or electric vehicle drive arrangement.

Further, the unmanned aerial vehicle 100 may include one or more processors 102$p$ configured to control flight or any other operation of the unmanned aerial vehicle 100. One or more of the processors 102$p$ may be part of a flight controller or may implement a flight controller. The one or more processors 102$p$ may be configured, for example, to provide a flight path based at least on a current position of the unmanned aerial vehicle 100 and a target position for the unmanned aerial vehicle 100. In some aspects, the one or more processors 102$p$ may control the unmanned aerial vehicle 100 based on the map, as described in more detail below. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The motor controllers may control a drive power that may be supplied to the respective motor. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories may be implemented by any kind of one or more electronic storing entities, e.g. one or more volatile memories and/or one or more non-volatile memories. The one or more memories 102$m$ may be used, e.g., in interaction with the one or more processors 102$p$, to build and/or store a map, according to various aspects.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 101. The one or more sensors 101 may be configured to monitor a vicinity of the unmanned aerial vehicle 100. The one or more sensors 101 may be configured to detect obstacles in the vicinity of the unmanned aerial vehicle 100. According to various aspects, the one or more processors may be further configured to modify a predefined flight path of the unmanned aerial vehicle 100 based on detected obstacles to generate a collision free flight path to the target position avoiding obstacles in the vicinity of the unmanned aerial vehicle.

The one or more sensors 101 may include, for example, one or more cameras (e.g., a depth camera, a stereo camera, etc.), one or more ultrasonic sensors, one or more radar (radio detection and ranging) sensors, one or more lidar (light detection and ranging) sensors, etc. The one or more sensors 101 may include, for example, any other suitable sensor that allows a detection of an object and the corresponding position of the object. The unmanned aerial vehicle 100 may further include a position detection system 102$g$. The position detection system 102$g$ may be based, for example, on global positioning system (GPS) or any other available positioning system. Therefore, the one or more processors 102$p$ may be further configured to modify a predefined flight path of the unmanned aerial vehicle 100 based on data obtained from the position detection system 102$g$. The position detection system 102$g$ may be used, for example, to provide flight data associated with the flight of the unmanned aerial vehicle 100 itself. The flight data may be associated with a position, an attitude, movement, etc., of the unmanned aerial vehicle 100. However, other sensors (e.g., image sensors, a magnetic sensor, etc.) may be used to provide flight data of the unmanned aerial vehicle 100. The flight data of the unmanned aerial vehicle 100 may be used to generate a modified-reality image for the pilot to provide additional information associated with the flight of the unmanned aerial vehicle 100 to the pilot.

According to various aspects, the one or more processors 102p may include at least one transceiver 102t configured to provide an uplink transmission and/or downlink reception of radio signals including data, e.g. video or image data and/or commands. The at least one transceiver may include a radio frequency (RF) transmitter and/or a radio frequency (RF) receiver. The one or more processors 102p may be configured to transmit data associated with the position of the unmanned aerial vehicle 100 and/or the attitude of the unmanned aerial vehicle 100 to an external device, e.g., to a remote control and/or to a modified-reality device (see, for example, FIG. 6) via the at least one transceiver 102t.

The one or more processors 102p may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a velocity (also referred to as flight velocity), a direction (also referred to as flight direction), etc., may be implemented in the one or more processors 102p and/or in additional components coupled to the one or more processors 102p.

According to various aspects, the one or more processors 102p of the unmanned aerial vehicle 100 may be configured to implement an obstacle avoidance. To receive, for example, position information and/or movement data about one or more obstacles, the input of a depth image camera and image processing may be used. Further, to store the respective information in the (e.g., internal) map of the unmanned aerial vehicle 100, as described in more detail below, at least one computing resource may be used. According to various aspects, the map that may be at least partially generated based on sensor data of the unmanned aerial vehicle 100 may be used to render a virtual image from a point of view outside the unmanned aerial vehicle 100, e.g., from a position at the ground where the pilot of the unmanned aerial vehicle 100 is located. According to various aspects, the virtual image rendered based on the map may be used to generate a modified-reality image for the pilot to provide additional information associated with the flight of the unmanned aerial vehicle 100 to the pilot.

In the following, a modified-reality device is described, according to various aspects. The modified-reality device may include or may be a head-mounted device that may be worn by the user, wherein the user may be the pilot of an unmanned aerial vehicle 100, as described above. The modified-reality device and/or the head-mounted device may be configured to add additional information to the view of the user. In this case, the pilot wearing the head-mounted device may be still able to see the unmanned aerial vehicle 100 if this is within line of sight.

Figure 2A:
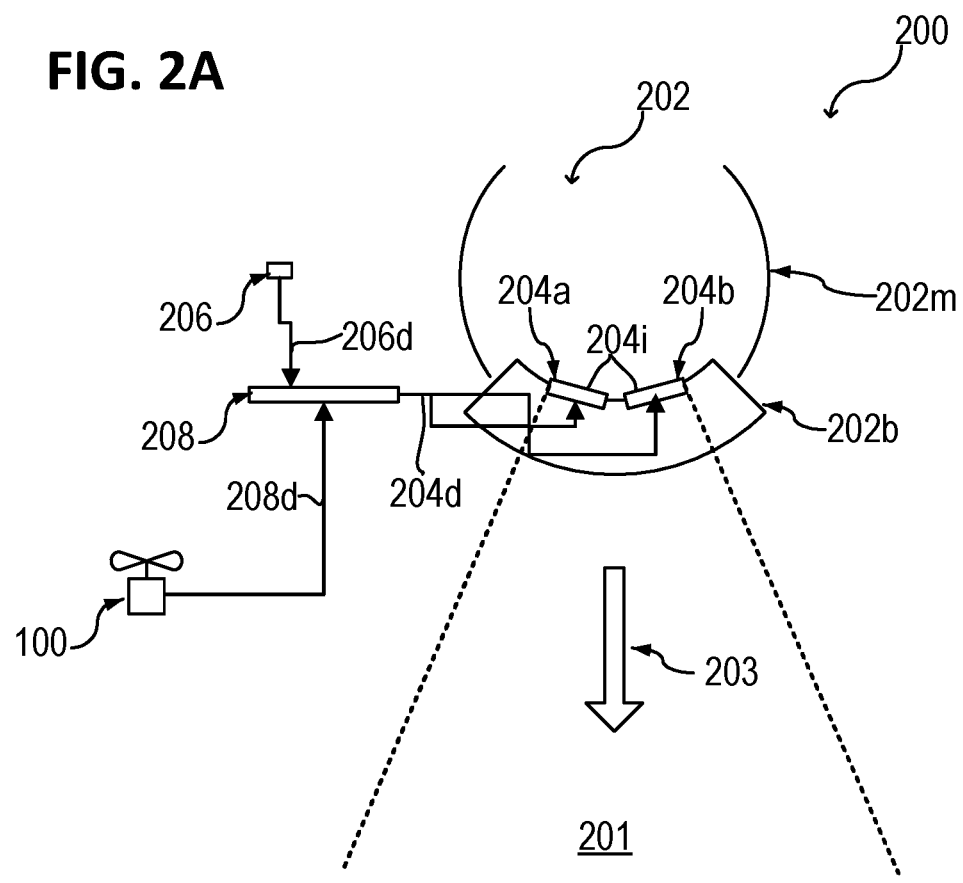
FIGS. 2A to 2C show a modified-reality device in a schematic illustration, according to various aspects.
Figure 2B:
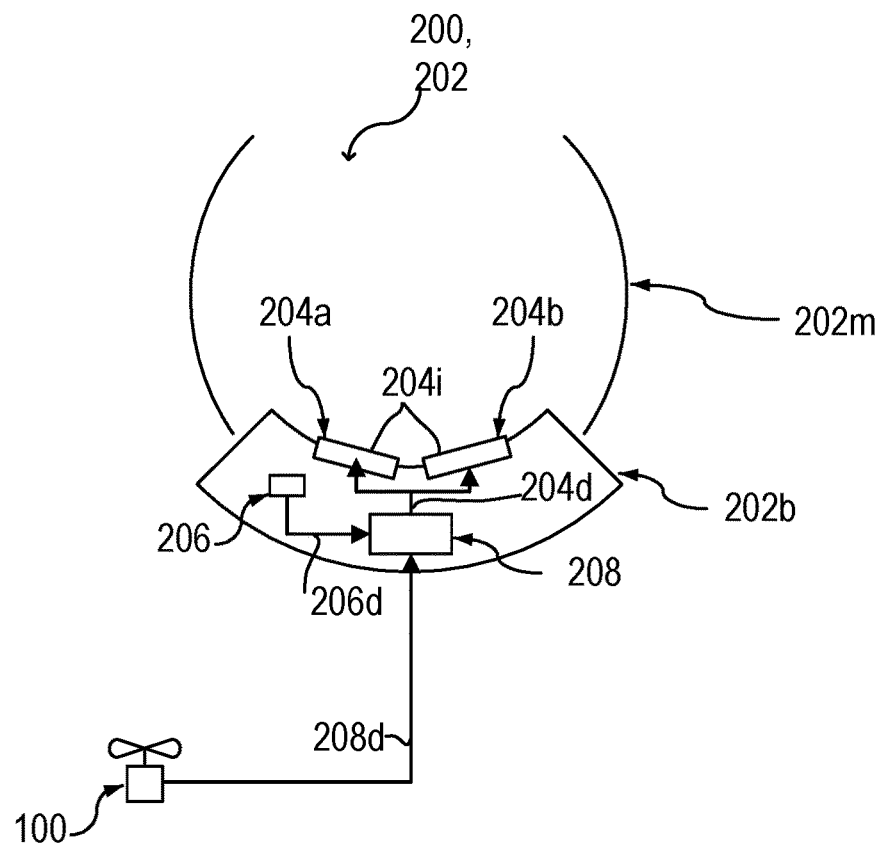

FIG. 2A and FIG. 2B show a modified-reality device 200 in a schematic illustration, according to various aspects. The modified-reality device 200 may include a head-mounted device 202 including one or more displays 204a, 204b. The one or more displays 204a, 204b may be configured to receive image data 204d representing at least an image element. The one or more displays 204a, 204b may be further configured to display a modified-reality image 204i including at least the image element, see, for example, FIG. 3A. The head-mounted device 202 may include glasses, goggles, a visor, or any other suitable device that may be mounted in a fixed position relative to the head of the user. The head-mounted device 202 may include a body 202b and a mount structure 202m to mount the body 202b in a fixed position relative to the user's head. The one or more displays 204a, 204b of the head-mounted device 202 may be configured to display the modified-reality image 204i within the user's field of view or to project the modified-reality image 204i onto the retina of the user's eyes (also referred to as virtual retinal display).

The modified-reality device 200 may further include one or more sensors 206 configured to provide head tracking data 206d associated with a position and orientation of the head-mounted device 202. The position of the head-mounted device 202 may be substantially equal to the position of the user of the head-mounted device 202. The user may control (e.g., steer via a remote control) an unmanned aerial vehicle 100. Illustratively, the user of the modified-reality device 200 wearing the head-mounted device 202 may be the pilot of the unmanned aerial vehicle 100. The orientation of the head-mounted device 202 may be associated with an orientation of the user's head and therefore, the orientation of the head-mounted device 202 may be associated with a viewing direction 203 of the user. The head-mounted device 202 (e.g., the position of the one or more displays relative to the user's eyes) may defined a field of view 201 (i.e. the angular expanse visible through the head-mounted device 202 at a given time).

The modified-reality device 200 may further include a processing arrangement 208. The processing arrangement 208 may include one or more processors, one or more memories, one or more communication interfaces to receive data, e.g., one or more transceivers, one or more receivers, one or more transmitters, etc. The processing arrangement 208 may be configured to receive flight data 208d associated with a flight of an unmanned aerial vehicle 100. The processing arrangement 208 may be further configured to generate the image data 204d representing at least the image element based on the head tracking data 206d and the flight data 208d. The processing arrangement 208 may be further configured to provide the image data 204d to the one or more displays 204a, 204b.

As illustrated exemplarily in FIG. 2A, the one or more sensors 206 and the processing arrangement 208 may be communicatively coupled with each other and with the one or more displays 204a, 204b. The communication between the respective components may be implemented using any suitable a wired and/or wireless data transmission. The one or more sensors 206 and the processing arrangement 208 may be disposed spaced apart from the head-mounted device 202. As an example, the one or more sensors 206 and/or the processing arrangement 208 may be integrated (e.g., partially or completely) into a remote control device that the user of the head-mounted device 202 may use to control the unmanned aerial vehicle 100. As another example, the one or more sensors 206 and/or the processing arrangement 208 may be integrated (e.g., partially or completely) into an additional computing device that the user of the head-mounted device 202 may carry with him. Alternatively, as illustrated exemplarily in FIG. 2B, the one or more sensors 206 and/or the processing arrangement 208 may be integrated into the head-mounted device 202.

According to various aspects, the modified-reality device 200 may further include a power supply, e.g., one or more batteries, etc.

Figure 2C:
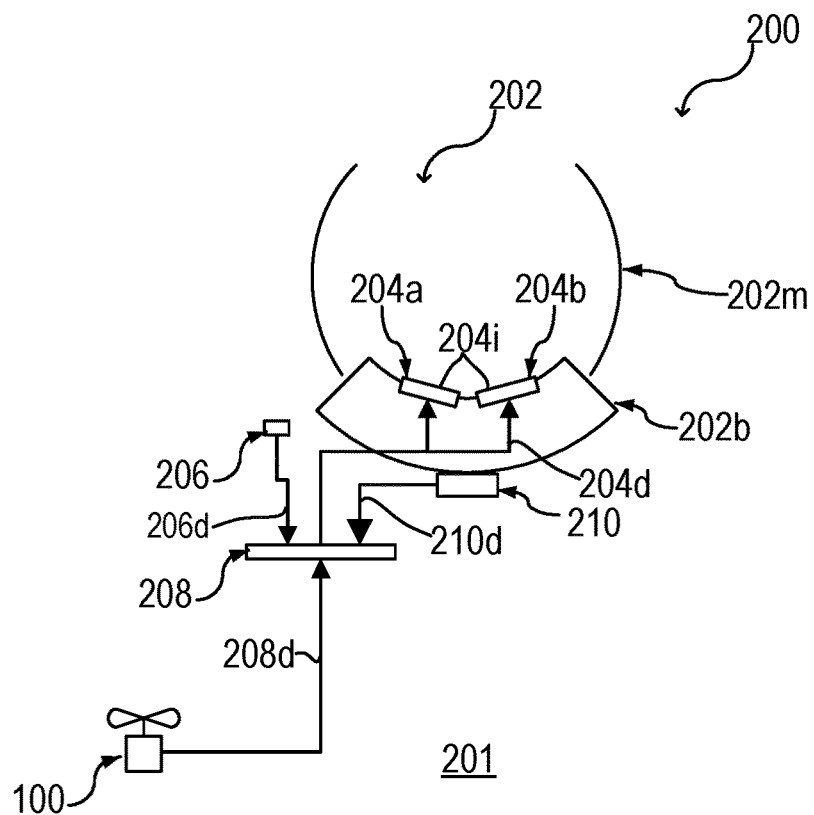

According to various embodiments, the modified-reality device 200 may include at least one camera 210, as exemplarily illustrated in FIG. 2C in a schematic view. The at least one camera 210 may be mounted at the head-mounted device 202. The at least one camera may be a stereoscopic camera. The at least one camera 210 may be configured to provide camera image data 210d to the processing arrangement 208, the camera image data 210d representing an image of the field of view 201 that a user wearing the head-mounted device 202 would have. Illustratively, the real-world view of the user may be replaced accordingly via a camera image of the real-world obtained by the at least one camera 210. In this case, the image data 204d provided to the one or more displays 204a, 204b may represent a mixed image including the at least one image element and the camera image received from the at least one camera 210.

Figure 3A:
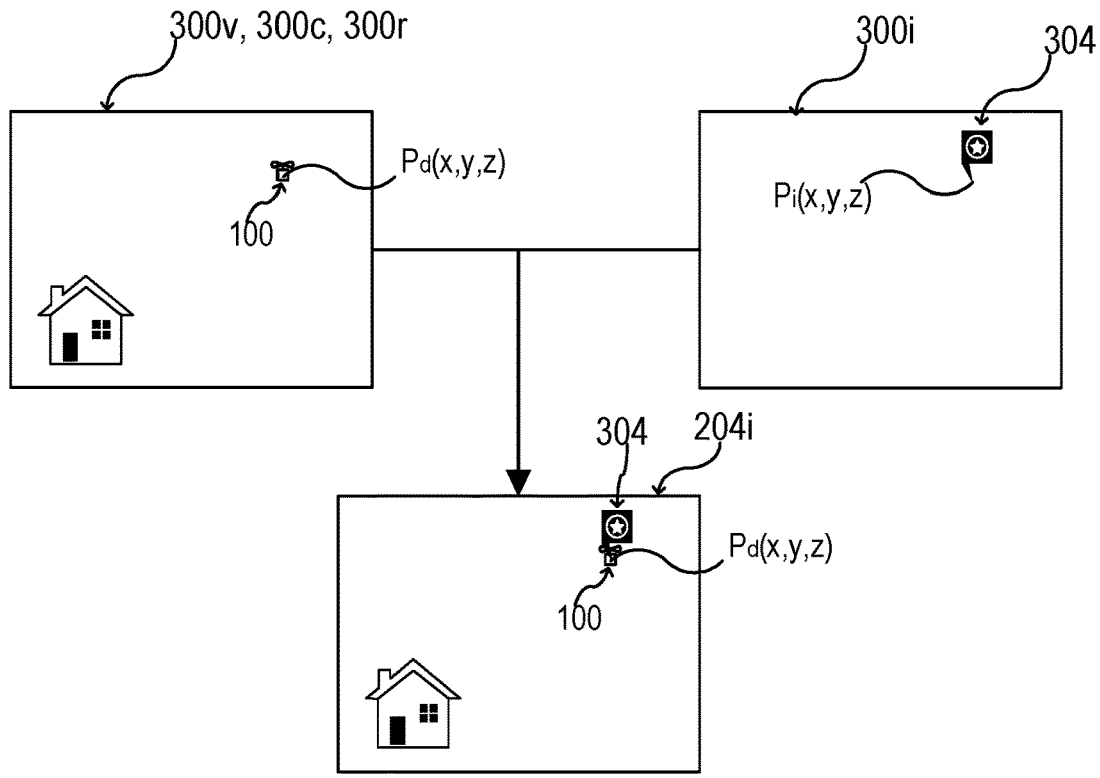
FIGS. 3A and 3B show a construction of a modified-reality image in a schematic illustration, according to various aspects.

FIG. 3A illustrates exemplarily the construction of a modified-reality image 204i, according to various aspects. According to various aspects, the modified-reality image 204i may include the at least one image element 304, e.g., an icon, etc. As illustrated in FIG. 3A, the head-mounted device 202 may be configured to allow the user to see the real-world, as illustrated exemplarily by a real-world view 300v representing the current field of view of the user wearing the head-mounted device 202. The real-world view 300v may be provided by using a see-through configuration for the one or more displays 204a, 204b. In the see-through configuration, the image data 204d transmitted to the one or more displays 204a, 204b may include the at least one image element 304 and, accordingly, the display image 300i generated by the one or more displays 204a, 204b may include the at least one image element 304. Due to the see-through configuration, the display image 300i may be superimposed to the real-world view 300v to obtain the modified-reality image 204i. According to various aspects, the modified-reality image 204i may include the at least one image element 304 that is superimposed on the field of view 201 (e.g., the real-world view 300v) of the user. In this case, no camera may be needed for the operation of the modified-reality device 200.

The position of the at least one image element 304 in the display image 300i and, therefore, in the modified-reality image 204i may be calculated based on the known position Pd(x,y,z) of the unmanned aerial vehicle 100, the position Pi(x,y,z) of the user wearing the head-mounted device 202, and the orientation of the user's head. Illustratively, if the user is looking into the direction of the unmanned aerial vehicle 100 (e.g., if the unmanned aerial vehicle 100 is within field of view 201 of the user), the visibility of the position and/or orientation of the unmanned aerial vehicle 100 may be enhanced by displaying the at least one image element 304 in the modified-reality image 204i at the actual position Pd(x,y,z) of the unmanned aerial vehicle 100.

As described above (e.g., with reference to FIG. 2C), the modified-reality image 204i may include the at least one image element that may be superimposed on a camera image 300c representing the real-world view 300v (i.e. substantially the field of view) of a user wearing the head-mounted device 202.

In the case that a camera image is used to generate the modified reality image 204i; a brightness and/or color correction procedure may be implemented, e.g., to increase visibility of the unmanned aerial vehicle 100 for the user, to increase image viewability for the human eye, etc. The brightness and/or color correction may be performed by the processing arrangement 208 in accordance with pre-defined settings. As an example, an excessively bright video input provided by the camera, e.g. in the case that the user looks into the sun, may be corrected, e.g., the displayed brightness may be reduced (e.g., to a pre-defined maximal value) to not blind the pilot and/or to show where the unmanned aerial vehicle is currently located. According to various aspects, the brightness of the camera image may be corrected (e.g., reduced) only for one or more sections of the camera image. According to various aspects, the brightness of the camera image may be corrected dynamically, e.g., the camera image may be analyzed at pre-defined points in time and may be corrected in accordance with the result of the analysis.

Further, the modified-reality image 204i may include the at least one image element 304 that may be superimposed on a computer-generated (rendered) image 300r representing the real-world view 300v (i.e. the field of view 201) of a user wearing the head-mounted device 202. The computer-generated image 300r may be rendered via a computing system, e.g., using a three-dimensional graphics engine. According to various aspects, a computer-generated map may be used, as described in more detail below. In this case, the modified-reality image 204i may be a (e.g., completely) virtual image. In this case, the position of the at least one image element may be determined within the rendered image.

Figure 3B:
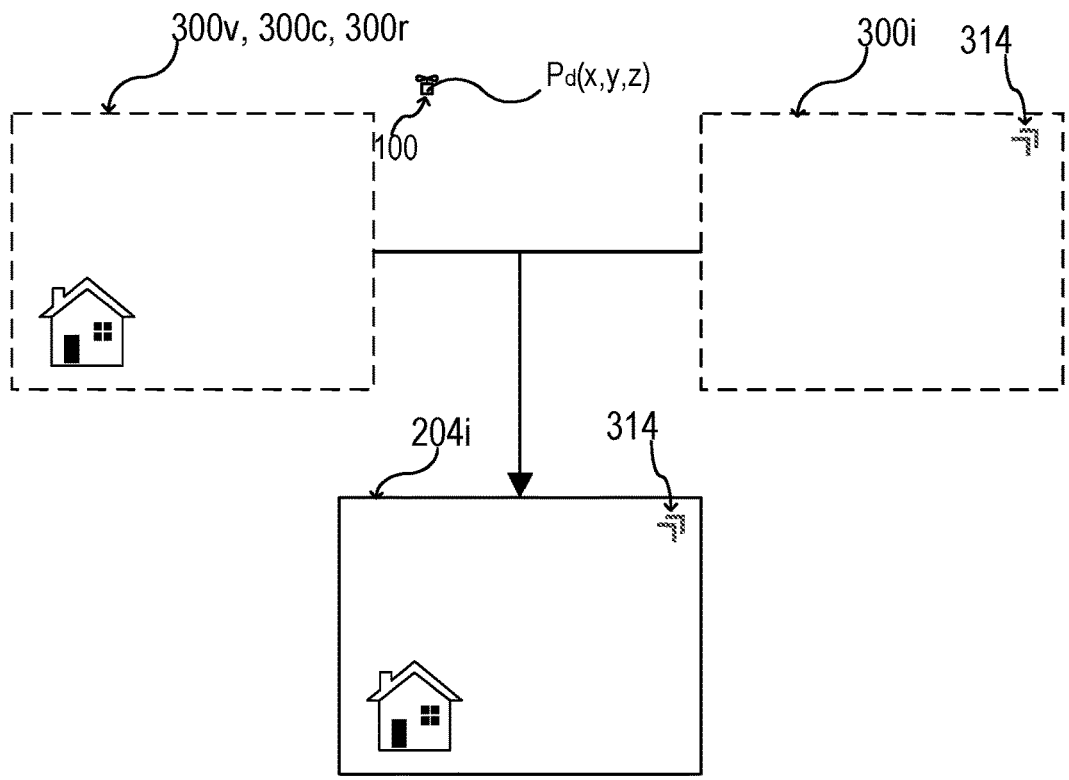

FIG. 3A shows the modified-reality image 204i in the case that the unmanned aerial vehicle 100 is within the user's field of view. In the alternative case, as illustrated in FIG. 3B the processing arrangement 208 may be configured to generate an image element 314 (e.g., an arrow) that directs toward the current position of the unmanned aerial vehicle 100. This may be done under circumstances such as where the unmanned aerial vehicle 100 is outside the field of view 201 of the user. This may, for example, help the user to find the unmanned aerial vehicle 100 during flight where the user has lost visual contact with the unmanned aerial vehicle.

Figure 4:
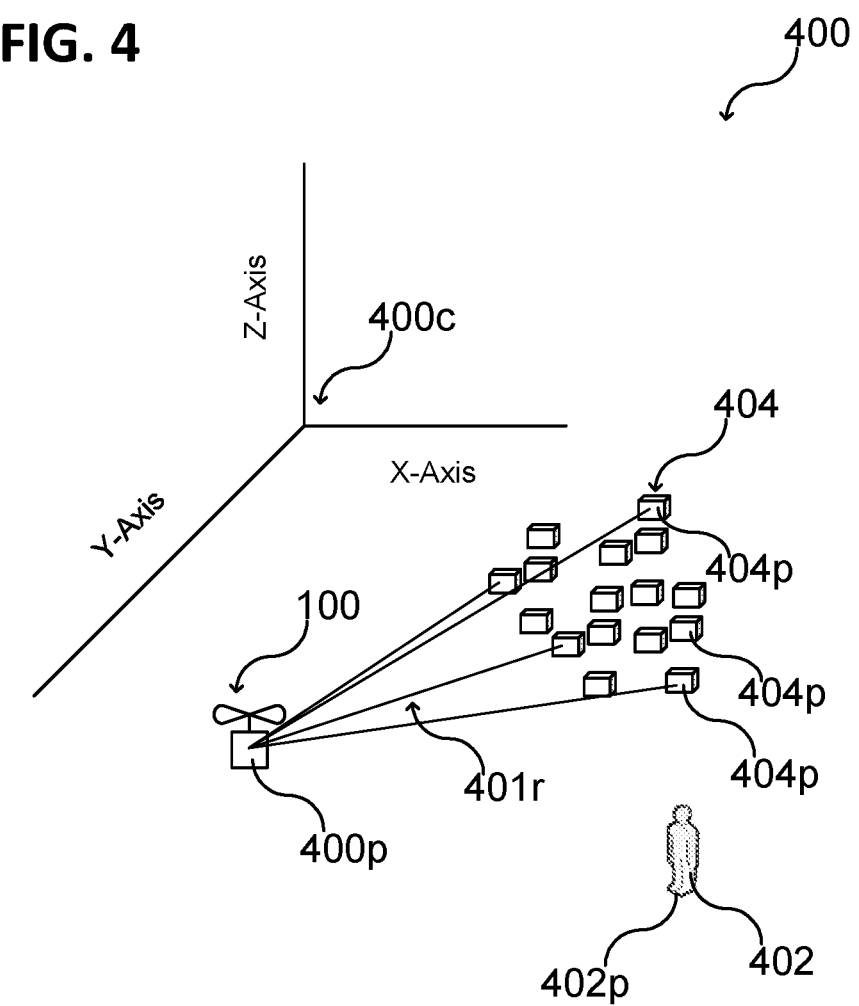
FIG. 4 shows a computer-generated map in a schematic illustration, according to various aspects.

FIG. 4 illustrates a map 400 that that may be used to generate a virtual image of the vicinity of the unmanned aerial vehicle 100 and the pilot. The pilot may wear the head-mounted device 202 of the modified-reality device 200. According to various aspects, the map 400 may be computer-generated. The map 400 may be further used, for example, to control flight of an unmanned aerial vehicle 100, according to various aspects. The unmanned aerial vehicle 100 may be represented in the map 400. Further, the user 402 piloting the unmanned aerial vehicle 100 may be represented in the map 400. As an example, a current position 400p of the unmanned aerial vehicle 100 may be dynamically tracked via the map 400. Further, a current position 402p of the user 402 may be dynamically tracked via the map 400. Further, one or more objects 404 may be represented in the map 400. As an example, a position 404p of the one or more objects 404 may be determined by the unmanned aerial vehicle 100 and stored in the map 102. The map 400 may be updated dynamically with respect to the one or more objects 404 upon receiving new information associated with the position 404p of the one or more objects 404.

According to various aspects, the map 400 may be a three-dimensional map representing the vicinity (or at least a part of the vicinity) of the unmanned aerial vehicle 100. The map 400 may include a coordinate system 400c. The coordinate system 400c may be, for example, a Cartesian coordinate system including three orthogonal axes (e.g., referred to as X-axis, Y-axis, and Z-axis). However, any other suitable coordinate system 400c may be used.

According to various aspects, the map 400 may be used to represent positions 404p of one or more objects 404 relative to a position 400p of the unmanned aerial vehicle 100 and relative to a position 402p of the user 402 piloting the unmanned aerial vehicle 100. According to various aspects, a computer engine (e.g., a 4D-computer engine) may be used to generate the map 400. For visualization, a graphic engine may be used. According to various embodiments, the computer engine and the graphic engine may be, for example, implemented via the processing arrangement 208 and/or via the one or more processors 102p of the unmanned aerial vehicle 100. According to various aspects, dynamics may be included in the map 400, e.g., movement of the unmanned aerial vehicle 100, the user 402, the one or more objects 404, appearance and disappearance of the one or more objects 404, etc.

According to various aspects, the information on how to build that map 400 may be received at least partially from one or more sensors configured to detect any type of objects 404 in a vicinity of the unmanned aerial vehicle 100. As an example, one or more cameras, e.g., one or more RGB cameras, one or more depth cameras, etc., may be used to obtain image data from the vicinity of the unmanned aerial vehicle 100. Based on the obtained image data, the map 400 may be built accordingly. According to various aspects, the map 400 may be at least partially built or updated during flight of the unmanned aerial vehicle 100 (e.g., on the fly starting with an empty map 400) using one or more sensors of the unmanned aerial vehicle 100. The information received by the one or more sensors may be stored in one or more memories 102m included in the unmanned aerial vehicle 100. Alternatively or additionally, the map 400 may include one or more predefined objects 404, etc. The predefined objects 404 may be known from a previous flight of the unmanned aerial vehicle 100 or from other information that may be used to build the map 400. According to various aspects, the map 400 of the unmanned aerial vehicle 100 may be correlated with a global map, e.g., via global positioning system (GPS) information, if desired.

According to various aspects, the map 400 may be a voxel map. In this case, the one or more objects 404 and their positions may be represented by one or more voxels in the voxel map. A voxel may include graphic information that defines a three-dimensional volume. Unlike a pixel, which defines a two-dimensional space based, for example, on an x-axis and a y-axis, a voxel may have the addition of a z-axis. According to various aspects, the voxels in the voxel map may be configured to carry additional information, such as thermal information, as described in more detail below. According to various aspects, the one or more voxels may be determined from a three-dimensional camera (depth camera) or a combination of image sensors or cameras providing image overlap (e.g., using a 4D-camera). The obtained image data may be processed by a voxel engine to transform the image data into voxels. The voxel engine may be implemented by a computing entity, e.g., including one or more processors, one or more a non-transitory computer readable media, etc. The translation of image data into voxels may be carried out using rasterization, volume ray casting, splattering, or any other volume rendering method. Once translated, the voxels may be stored in the voxel map. Once stored in the voxel map, the flight of the unmanned aerial vehicle 100 may be controlled based on the voxels stored on the voxel map.

According to various aspects, the map 400 may be a dynamic map, e.g., the map 400 may be updated (also referred to as built and/or rebuilt) in a pre-defined time interval, for example, new objects 404 may be added; objects may be deleted; positional changes of the objects may be monitored; etc. According to various aspects, the map 400 may be updated based on sensor data (e.g., obtained by one or more sensors of the unmanned aerial vehicle 100). Alternatively, the map 400 may be updated based on data transmitted to the unmanned aerial vehicle 100, e.g., via a wireless communication. In the map 400, the position 400p of the unmanned aerial vehicle 100 relative to the position 402p of the user 402 may change during flight of the unmanned aerial vehicle 100. A reference for a movement of the unmanned aerial vehicle 100, the user 402, and/or of the one or more objects 404 may be a fixed ground, e.g., defined by GPS information or other suitable information.

According to various aspects, the unmanned aerial vehicle 100 may be configured to check (e.g., during flight) for a collision with one or more objects 404 near the unmanned aerial vehicle 100 based on the map 400. In the case that a voxel map is used, the unmanned aerial vehicle 100 may check for a collision with the one or more objects 404 by ray tracing within the voxel map. However, other implementations of a collision detection may be used.

As illustrated in FIG. 4, in the map 400, the unmanned aerial vehicle 100 may trace rays 401r against the map (e.g., in any direction, in flight direction, within a sector along the flight direction, etc.) to determine how far objects 404 are away from the unmanned aerial vehicle 100. Further, the direction of the one or more objects 404 relative to the unmanned aerial vehicle 100 may be determined. According to various aspects, a collision avoidance operation may be carried out based on the relative position of the one or more objects 404 with respect to the actual position of the unmanned aerial vehicle 100. Illustratively upon pre-estimating a collision with one or more objects, these one or more objects may be regarded as obstacles, since a collision with a solid object in general may have a high likelihood of harming the unmanned aerial vehicle 100. As an example, the collision avoidance operations may include stopping at a pre-defined safety distance from the detected obstacle, circumflying the detected obstacle with a pre-defined safety distance, increasing distance from the detected obstacle, and/or returning to a pre-defined safety position (e.g., a starting position or return to home position).

A depth camera or a stereo camera may provide position information of the one or more obstacles relative to the position of the respective camera at the time when the image is taken. For transforming position information associated with the one or more obstacles of a depth camera or a stereo camera into a position on the map 400, the current position of the depth camera or the stereo camera itself (e.g., the current position of the unmanned aerial vehicle 100) may be used. Therefore, the map 400 may represent the absolute positions (e.g., the positions over ground) of the obstacles and the unmanned aerial vehicle 100. However, any other sensor or sensor arrangement may be used that is suitable to receive the desired obstacle information.

According to various aspects, a depth camera may be calibrated with its intrinsic and extrinsic camera parameters. Once that is done, depth information may be associated with the one or more obstacles to construct the map 400.

The map 400 may be used to generate the modified-reality image 204i or at least an image element 304, 314 included in the modified-reality image 204i. In this case, the real-world view of the user may be modified by displaying additionally one or more computer rendered image elements or by displaying a completely computer rendered view instead of the real-world view.

Figure 5:
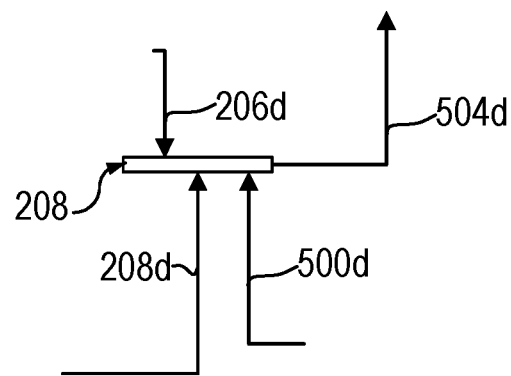
FIG. 5 shows the processing arrangement of a modified-reality device in a schematic illustration, according to various aspects.

FIG. 5 shows the processing arrangement 208 in a schematic illustration, according to various aspects. The processing arrangement 208 may be, for example, configured to receive additional data 500d. The processing arrangement 208 may be further configured to generate an additional image element based on the additional data 500d. The image data 504d transmitted to the one or more displays 204a, 204b may represent at least the image element 304, 314, as described above, and the additional image element. As an example, the additional data 500d may include obstacle data representing an obstacle in a vicinity of the unmanned aerial vehicle 100. In this case, the additional image element may represent the obstacle, accordingly. This may allow, for example, improved visibility of one or more obstacles for the user.

As another example, the additional data 500d may include viewport data representing a viewport associated with a zoomed-in view of the unmanned aerial vehicle. In this case, the additional image element may represent the zoomed-in view of the unmanned aerial vehicle piloted by the user. Based on the zoomed-in view of the unmanned aerial vehicle, the pilot may be able to visually determine an orientation (also referred to as attitude) of the unmanned aerial vehicle independent from the distance of the pilot to the unmanned aerial vehicle.

As another example, the additional data 500d may include training data representing a training flight task. In this case, the additional image element may represent the training flight task.

As another example, the additional data 500d may include sensor data representing a sensor value associated with one or more objects in the vicinity of the unmanned aerial vehicle. In this case, the additional image element may represent the sensor value.

Figure 6:
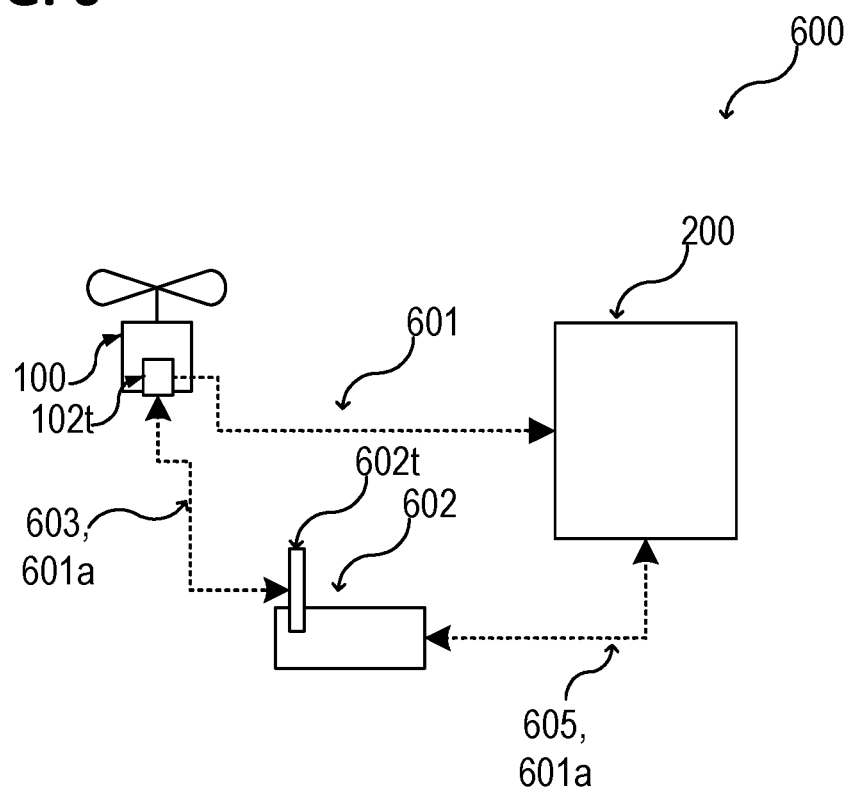
FIG. 6 shows a modified-reality device system in a schematic illustration, according to various aspects.

FIG. 6 shows a modified-reality device system 600, according to various aspects. The modified-reality device system 600 may include a modified-reality device 200 and an unmanned aerial vehicle 100, as described above. The modified-reality device 200 may be communicatively coupled (see reference sign 601) to the unmanned aerial vehicle 100. Flight data 208d may be (e.g., directly or indirectly) transmitted from the unmanned aerial vehicle 100 to the modified-reality device 200.

According to various aspects, the modified-reality device system 600 may further include a remote control 602. The remote control 602 may include a transmitter/receiver 602t to communicate 603 at least with the unmanned aerial vehicle 100. The remote control 602 may be communicatively coupled (see reference sign 603) at least to an unmanned aerial vehicle 100 to control the unmanned aerial vehicle 100 remotely. The remote control 602 may be used by the same user that wears the head-mounted device 202 of the modified-reality device 200 to control flight of the unmanned aerial vehicle 100.

Optionally, the remote control 602 may be communicatively coupled (see reference sign 605) to the modified-reality device 200. In this case, at least a part of the processing circuit 208 of the modified-reality device 200 may be implemented into the remote control 602. As an example, the remote control 602 may include one or more sensors that may be configured to determine the position of the head-mounted device indirectly, e.g., assuming that the position of the head-mounted device 202 and the remote control 602 are substantially the same, since they may be used at the same time by the same user.

According to some aspects, the modified-reality device 200 may be communicatively coupled to the unmanned aerial vehicle 100 indirectly (see reference sign 601a) via the remote control 602. In this case, both the unmanned aerial vehicle 100 and the modified-reality device 200 may be communicatively coupled to the remote control 602.

Figure 7:
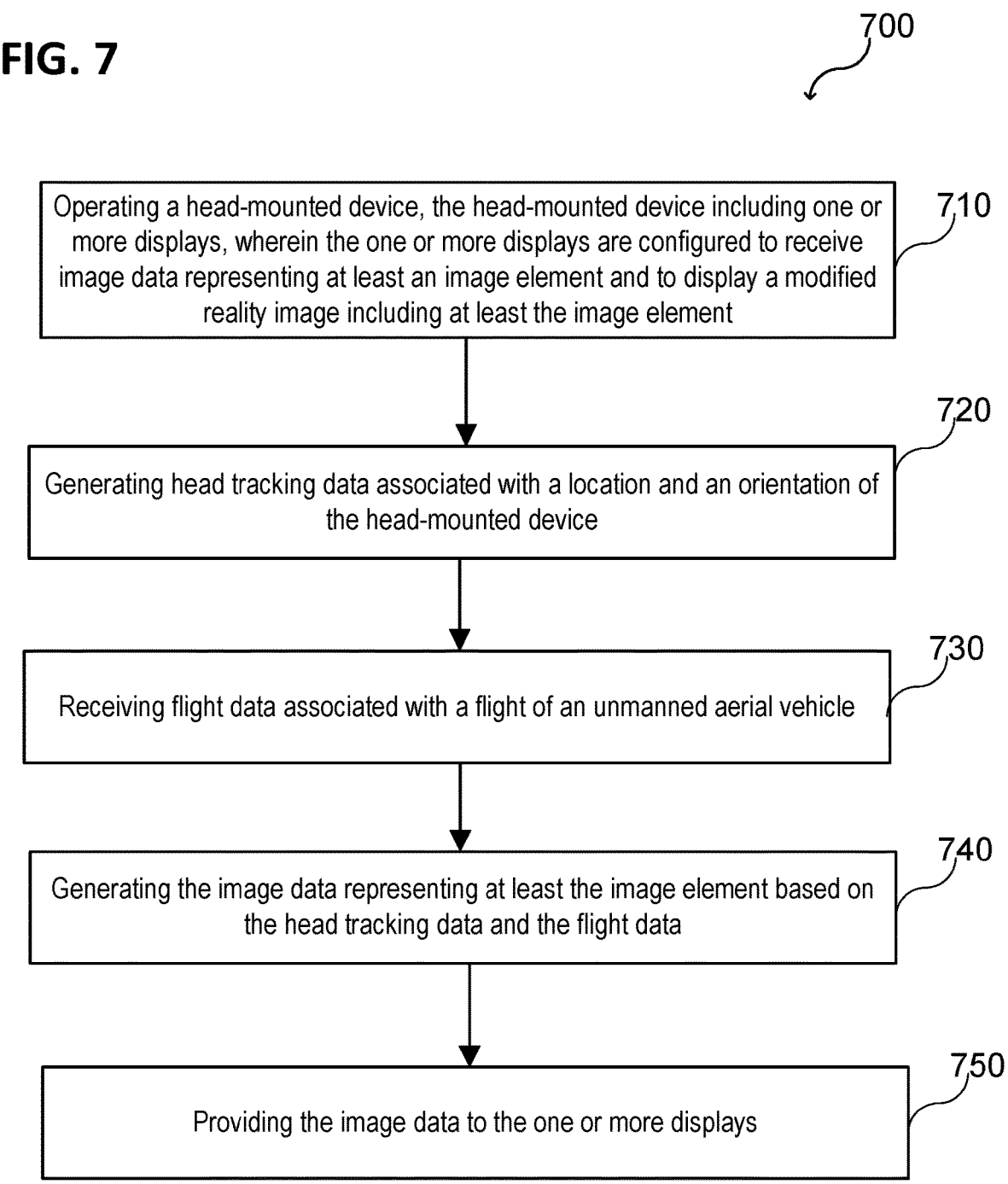
FIG. 7 shows an exemplary method for operating a modified-reality device, according to various aspects.

FIG. 7 illustrates a schematic flow diagram of a method 700 for operating a modified-reality device, according to various aspects. The method may include: in 710, operating a head-mounted device, the head-mounted device including one or more displays, wherein the one or more displays are configured to receive image data representing at least an image element and to display a modified-reality image including at least the image element; in 720, generating head tracking data associated with a position and an orientation of the head-mounted device; in 730, receiving flight data associated with a flight of an unmanned aerial vehicle; in 740, generating the image data representing at least the image element based on the head tracking data and the flight data; and, in 750, providing the image data to the one or more displays.

FIG. 8 illustrates a schematic flow diagram of a method 800 for operating a modified-reality device, according to various aspects. The method may include: in 810, generating head tracking data associated with a position and an orientation of a head-mounted device; in 820, generating flight data associated with a flight of an unmanned aerial vehicle; in 830, generating image data representing at least an image element based on the head tracking data and the flight data; and, in 840, providing the image data to one or more displays of the head-mounted device to display a modified-reality image including at least the image element.

In the following, various examples are provided with reference to the aspects described herein.

Example 1 is a modified-reality device, including: a head-mounted device including one or more displays, wherein the one or more displays are configured to receive image data representing at least an image element and to display a modified-reality image including at least the image element; one or more sensors configured to provide head tracking data associated with a location and an orientation of the head-mounted device; and a processing arrangement configured to receive flight data associated with a flight of an unmanned aerial vehicle, generate the image data representing at least the image element based on the head tracking data and the flight data, and provide the image data to the one or more displays.

In example 2, the modified-reality device of example 1 may include that the flight data are provided by one or more sensors of the unmanned aerial vehicle.

In example 3, the modified-reality device of example 2 may include that the unmanned aerial vehicle further includes one or more transmitters configured to transmit the flight data to the processing arrangement.

In example 4, the modified-reality device of any one of examples 1 to 3 may include that the flight data include location data associated with a location of the unmanned aerial vehicle, and, e.g., optionally, that the image element represents the location of the unmanned of the unmanned aerial vehicle relative to the location of the head-mounted device.

In example 5, the modified-reality device of example 4 may include that the processing arrangement is further configured to determine whether the unmanned aerial vehicle is inside or outside a field of view of a user of the head-mounted device based on the head tracking data and the flight data.

In example 6, the modified-reality device of example 5, may include that the processing arrangement is further configured to determine a time duration for which the unmanned aerial vehicle is outside the field of view and to instruct a safety operation in the case that the determined time duration is greater than a predefined safety time duration.

In example 7, the modified-reality device of example 5 or 6 may include that the image element directs toward a location of the unmanned aerial vehicle in the case that the unmanned aerial vehicle is outside the field of view.

In example 8, the modified-reality device of any one of examples 5 to 7 may include that the image element is located within the modified-reality image at an image position that represents the location of the unmanned aerial vehicle aerial vehicle in the case that the unmanned aerial vehicle is inside the field of view.

In example 9, the modified-reality device of any one of examples 1 to 8 may include that the flight data include attitude data associated with an attitude of the unmanned aerial vehicle. The image element represents the attitude of unmanned aerial vehicle.

In example 10, the modified-reality device of any one of examples 1 to 9 may include that the modified-reality image includes the image element superimposed on a field of view of a user of the head-mounted device.

In example 11, the modified-reality device of any one of examples 1 to 10 may include that the modified-reality image includes the image element superimposed on a camera image or a virtual image representing the field of view of a user of the head-mounted device.

In example 12, the modified-reality device of example 11 may include that the head-mounted device further includes one or more cameras configured to provide the camera image.

In example 13, the modified-reality device of any one of examples 1 to 10 may include that may include that the modified-reality image includes the image element superimposed on a brightness or color corrected camera image representing the field of view of a user of the head-mounted device.

In example 14, the modified-reality device of example 13 may include that the head-mounted device further includes one or more cameras configured to provide a camera image representing the field of view of a user of the head-mounted device and that the processing arrangement is configured to provide the brightness or color corrected camera image based on the camera image.

In example 15, the modified-reality device of example 11 may include that the processing arrangement is further configured to provide the virtual image based on a three dimensional map representing a vicinity of the head-mounted device and the unmanned aerial vehicle.

In example 16, the modified-reality device of any one of examples 1 to 15 may include that the processing arrangement is further configured to receive additional data and to generate an additional image element based on the additional data, the modified-reality image further including the additional image element.

In example 17, the modified-reality device of example 16 may include that the additional data include obstacle data representing an obstacle in a vicinity of the unmanned aerial vehicle and that the additional image element represents the obstacle.

In example 18, the modified-reality device of example 16 may include that the additional data include no-fly zone data representing a no-fly zone in a vicinity of the unmanned aerial vehicle and that the additional image element represents the no-fly zone.

In example 19, the modified-reality device of example 16 may include that the additional data include viewport data representing a viewport associated with a zoomed-in view of the unmanned aerial vehicle and that the additional image element represents the zoomed-in view of the unmanned aerial vehicle.

In example 20, the modified-reality device of example 16 may include that the additional data include training data representing a training flight task and that the additional image element represents the training flight task.

In example 21, the modified-reality device of example 16 may include that the additional data include sensor data representing a sensor value associated with one or more objects in the vicinity of the unmanned aerial vehicle and that the additional image element represents the sensor value.

Example 22 is a modified-reality device system, the system including: a modified-reality device according to any one of examples 1 to 21, and the unmanned aerial vehicle.

In example 23, the modified-reality device system of example 22, may further include: a remote control linked at least to the unmanned aerial vehicle to control the unmanned aerial vehicle remotely.

Example 24 is a method for operating a modified-reality device, the method including: operating a head-mounted device, the head-mounted device including one or more displays, wherein the one or more displays are configured to receive image data representing at least an image element and to display a modified-reality image including at least the image element; generating head tracking data associated with a location and an orientation of the head-mounted device; receiving flight data associated with a flight of an unmanned aerial vehicle; generating the image data representing at least the image element based on the head tracking data and the flight data; and providing the image data to the one or more displays.

Example 25 is a method for operating a modified-reality device, the method including: generating head tracking data associated with a location and an orientation of a head-mounted device; generating flight data associated with a flight of an unmanned aerial vehicle; generating image data representing at least an image element based on the head tracking data and the flight data; and providing the image data to one or more displays of the head-mounted device to display a modified-reality image including at least the image element.

In example 26, the method of example 25 may include that the flight data are provided by one or more sensors of the unmanned aerial vehicle.

In example 27, the method of example 25 or 26 may include that the flight data include location data associated with a location of the unmanned aerial vehicle, and that the image element represents the location of the unmanned of the unmanned aerial vehicle relative to the location of the head-mounted device.

In example 28, the method of example 27 may further include: determining whether the unmanned aerial vehicle is inside or outside a field of view of a user of the head-mounted device based on the head tracking data and the flight data.

In example 29, the method of example 28 may further include: determining a time duration for which the unmanned aerial vehicle is outside the field of view and instructing a safety operation in the case that the determined time duration is greater than a predefined safety time duration.

In example 30, the method of example 28 or 29 may include that the image element directs toward a location of the unmanned aerial vehicle in the case that the unmanned aerial vehicle is outside the field of view.

In example 31, the method of any one of examples 28 to 30 may include that the image element is located within the modified-reality image at an image position that represents the location of the unmanned aerial vehicle aerial vehicle in the case that the unmanned aerial vehicle is inside the field of view.

In example 32, the method of any one of examples 25 to 31 may include that the flight data include attitude data associated with an attitude of the unmanned aerial vehicle. The image element is representing the attitude of unmanned aerial vehicle.

In example 33, the method of any one of examples 25 to 32 may include that the modified-reality image includes the image element superimposed on a field of view of a user of the head-mounted device.

In example 34, the method of any one of examples 25 to 33 may include that the modified-reality image includes the image element superimposed on a camera image or a virtual image representing the field of view of a user of the head-mounted device.

In example 35, the method of example 34 may further include: providing the camera image by one or more cameras mounted at the head-mounted device.

In example 36, the method of any one of examples 25 to 35 may include that the modified-reality image includes the image element superimposed on a brightness or color corrected camera image representing the field of view of a user of the head-mounted device.

In example 37, the method of example 36 may further include: providing a camera image representing the field of view of a user of the head-mounted device by one or more cameras mounted at the head-mounted device and providing the brightness or color corrected camera image based on the camera image.

In example 38, the method of example 34 may further include: providing the virtual image based on a three dimensional map representing a vicinity of the head-mounted device and the unmanned aerial vehicle.

In example 39, the method of any one of examples 25 to 38 may further include: receiving additional data and generating an additional image element based on the additional data, the modified-reality image further including the additional image element.

In example 40, the method of example 39 may include that the additional data include obstacle data representing an obstacle in a vicinity of the unmanned aerial vehicle and that the additional image element represents the obstacle.

In example 41, the method of example 39 may include that the additional data include no-fly zone data representing a no-fly zone in a vicinity of the unmanned aerial vehicle and that the additional image element represents the no-fly zone.

In example 42, the method of example 39 may include that the additional data include viewport data representing a viewport associated with a zoomed-in view of the unmanned aerial vehicle and that the additional image element represents the zoomed-in view of the unmanned aerial vehicle.

In example 43, the method of example 39 may include that the additional data include training data representing a training flight task and that the additional image element represents the training flight task.

In example 44, the method of example 39 may include that the additional data include sensor data representing a sensor value associated with one or more objects in the vicinity of the unmanned aerial vehicle and that the additional image element represents the sensor value.

Example 45 is a modified-reality device, including: a head-mounted device including one or more displays, wherein the one or more displays are configured to display a modified-reality image, the modified-reality image including at least an image element superimposed on a real-world view at a pre-defined image position; one or more sensors configured to provide head tracking data associated with a location and an orientation of the head-mounted device; a processing arrangement configured to receive flight data associated with a flight of an unmanned aerial vehicle and to calculate the pre-defined image position based on the head tracking data and the flight data.

In example 46, the modified-reality device of example 45 may include that the flight data include location data associated with a location of the unmanned aerial vehicle, and that the image element represents the location of the unmanned of the unmanned aerial vehicle relative to the location of the head-mounted device.

Example 47 is a modified-reality device, including: a head-mounted device including one or more displays and one or more cameras, wherein the one or more cameras are configured to generate a live image associated with a real-world view and wherein the one or more displays are configured to display a modified-reality image, the modified-reality image including at least an image element superimposed on the live image at a pre-defined image position; one or more sensors configured to provide head tracking data associated with a location and an orientation of the head-mounted device; a processing arrangement configured to receive flight data associated with a flight of an unmanned aerial vehicle and to calculate the pre-defined image position based on the head tracking data and the flight data.

In example 48, the modified-reality device of example 47 may include that the flight data include location data associated with a location of the unmanned aerial vehicle, and that the image element represents the location of the unmanned of the unmanned aerial vehicle relative to the location of the head-mounted device.

Example 49 is a modified-reality device, including: a head-mounted device including one or more displays, wherein the one or more displays are configured to display a virtual-reality image, the virtual-reality image including a computer generated view from the perspective of a user of the head-mounted device and an image element associated with an unmanned aerial vehicle piloted by the user; one or more sensors configured to provide head tracking data associated with a location and an orientation of the head-mounted device; a processing arrangement configured to receive flight data associated with a flight of an unmanned aerial vehicle and to generate the virtual-reality image based on the head tracking data and the flight data.

In example 50, the modified-reality device of example 49 may include that the flight data include location data associated with a location of the unmanned aerial vehicle, and that the image element represents the location of the unmanned of the unmanned aerial vehicle relative to the location of the head-mounted device.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A modified-reality device, comprising:
a head-mounted device comprising one or more displays, wherein the one or more displays are configured to:
receive image data representing an image element and
display a modified-reality image comprising the image element;
one or more sensors configured to provide head tracking data associated with a location and an orientation of the head-mounted device; and
a processing arrangement configured to:
receive flight data associated with a flight of an unmanned aerial vehicle, wherein the flight data comprises location data associated with a location of the unmanned aerial vehicle,
generate the image data representing the image element based on the head tracking data and the flight data, and
provide the image data to the one or more displays,
wherein the image element represents the location of the unmanned aerial vehicle relative to the location of the head-mounted device.

2. The modified-reality device of claim 1,
wherein the processing arrangement is further configured to determine whether the unmanned aerial vehicle is inside or outside a field of view of the head-mounted device based on the head tracking data and the flight data.

3. The modified-reality device of claim 2,
wherein the processing arrangement is further configured to:
determine a time duration for which the unmanned aerial vehicle is outside the field of view and
instruct a safety operation in the case that the determined time duration is greater than a predefined safety time duration.

4. The modified-reality device of claim 2,
wherein the image element is configured to direct a viewing direction of the modified-reality device toward a location of the unmanned aerial vehicle in the case that the unmanned aerial vehicle is outside the field of view.

5. The modified-reality device of claim 2,
wherein the image element is located within the modified-reality image at an image position that represents the location of the unmanned aerial vehicle in the case that the unmanned aerial vehicle is inside the field of view.

6. The modified-reality device of claim 1,
wherein the flight data comprises attitude data associated with an attitude of the unmanned aerial vehicle, and
wherein the image element further represents the attitude of unmanned aerial vehicle.

7. The modified-reality device of claim 1,
wherein the modified-reality image comprises the image element superimposed on a field of view the head-mounted device.

8. The modified-reality device of claim 1,
wherein the modified-reality image comprises:
the image element superimposed on a camera image, or a virtual image representing a field of view of the head-mounted device.

9. The modified-reality device of claim 8,
wherein the head-mounted device further comprises one or more cameras configured to provide the camera image.

10. The modified-reality device of claim 8,
wherein the processing arrangement is further configured to provide the virtual image based on a three dimensional map representing a vicinity of the head-mounted device and the unmanned aerial vehicle.

11. The modified-reality device of claim 1,
wherein the modified-reality image comprises the image element superimposed on a brightness or color corrected camera image representing a field of view of the head-mounted device.

12. The modified-reality device of claim 11,
wherein the head-mounted device further comprises one or more cameras configured to provide a camera image representing the field of view of the head-mounted device, and
wherein the processing arrangement is further configured to provide the brightness or color corrected camera image based on the camera image.

13. The modified-reality device of claim 1,
wherein the processing arrangement is further configured to:
receive additional data, and
generate an additional image element based on the additional data, and
wherein the modified-reality image further comprises the additional image element.

14. The modified-reality device of claim 1,
wherein the additional data comprises viewport data representing a zoomed-in view of the unmanned aerial vehicle.

15. A modified-reality device system, the system comprising:
a modified-reality device and an unmanned aerial vehicle, the modified-reality device comprising:
a head-mounted device comprising one or more displays,
wherein the one or more displays are configured to:
receive image data representing at least an image element, and
display a modified-reality image comprising the image element;
one or more sensors configured to provide head tracking data associated with a location and an orientation of the head-mounted device; and
a processing arrangement configured to:
receive flight data associated with a flight of an unmanned aerial vehicle,
generate the image data representing the image element based on the head tracking data and the flight data, and
provide the image data to the one or more displays.

16. The modified-reality device system of claim 15, further comprising:
a remote control configured to communicate with the unmanned aerial vehicle to control the unmanned aerial vehicle.

17. A method for operating a modified-reality device, the method comprising:

generating head tracking data associated with a location and an orientation of a head-mounted device;

generating flight data associated with a flight of an unmanned aerial vehicle;

generating image data representing at least an image element based on the head tracking data and the flight data; and providing the image data to one or more displays of the head-mounted device to display a modified-reality image comprising at least the image element.

18. The method of claim 17, further comprising:

providing the flight data by one or more sensors of the unmanned aerial vehicle.

19. The method of claim 18, wherein the modified-reality image comprises the image element superimposed on a field of view of the head-mounted device.

20. The method of claim 18, wherein the modified-reality image comprises the image element superimposed on a camera image or a virtual image representing the field of view of the head-mounted device.

* * * * *